United States Patent
Zhu et al.

(10) Patent No.: US 11,758,458 B2
(45) Date of Patent: Sep. 12, 2023

(54) TECHNIQUES FOR MANAGING BASE STATION BEAM PANIC FOR NEW RADIO TECHNOLOGIES

(71) Applicant: QUALCOMM Incorporated, San Diego, CA (US)

(72) Inventors: Jun Zhu, San Diego, CA (US); Mihir Vijay Laghate, San Diego, CA (US); Yongle Wu, San Diego, CA (US); Raghu Narayan Challa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/465,491

(22) Filed: Sep. 2, 2021

(65) Prior Publication Data

US 2023/0067908 A1  Mar. 2, 2023

(51) Int. Cl.
*H04W 36/30* (2009.01)
*H04B 7/06* (2006.01)
*H04W 36/00* (2009.01)
*H04B 7/08* (2006.01)
*H04W 36/06* (2009.01)

(52) U.S. Cl.
CPC .......... *H04W 36/30* (2013.01); *H04B 7/0632* (2013.01); *H04B 7/0695* (2013.01); *H04W 36/0058* (2018.08); *H04W 36/06* (2013.01)

(58) Field of Classification Search
CPC . H04W 36/30; H04W 36/0058; H04W 36/06; H04B 7/0632; H04B 7/0695
See application file for complete search history.

(56) References Cited

U.S. PATENT DOCUMENTS

| 11,115,835 B2* | 9/2021 | Byun | H04W 72/542 |
| 2019/0394662 A1* | 12/2019 | Josan | H04W 24/10 |
| 2020/0314708 A1* | 10/2020 | Jassal | H04W 36/08 |
| 2020/0366430 A1* | 11/2020 | Yu | H04B 7/08 |
| 2021/0068123 A1* | 3/2021 | Zhu | H04B 7/0814 |
| 2022/0124514 A1* | 4/2022 | Lee | H04W 74/0841 |
| 2022/0167186 A1* | 5/2022 | Xu | H04B 17/309 |

(Continued)

FOREIGN PATENT DOCUMENTS

WO    2017204932 A1    11/2017

OTHER PUBLICATIONS

China Unicom: "Discussion on Beam Correspondence Validity", 3GPP TSG RAN WG1 Meeting #89, R1-1708871, 3rd Generation Partnership Project, Mobile Competence Centre, 650, Route Des Lucioles, F-06921 Sophia-Antipolis Cedex, France, vol. RAN WG1, No. Hangzhou, May 15-19, 2017, May 14, 2017, XP051274054, paragraphs [02.1], [02.2], figure 1, 3 Pages.

(Continued)

*Primary Examiner* — Harry H Kim
(74) *Attorney, Agent, or Firm* — Arent Fox, LLP

(57) ABSTRACT

Techniques for managing base station beam panic for new radio technologies may include a user equipment (UE) measuring a signal quality of a serving beam from a base station. The UE may determine the signal quality has decreased by at least a threshold amount, and enable a signal panic operation to search for a beam different from the serving beam, in response to the signal quality decreasing by at least the threshold amount.

19 Claims, 5 Drawing Sheets

(56) References Cited

U.S. PATENT DOCUMENTS

2022/0191961 A1\* 6/2022 Qiu ...................... H04W 76/20
2023/0028423 A1\* 1/2023 Xu ...................... H04B 7/0663

OTHER PUBLICATIONS

Partial International Search Report—PCT/US2022/075437—ISA/EPO—dated Dec. 6, 2022.
International Search Report and Written Opinion—PCT/US2022/075437—ISA/EPO—dated Feb. 3, 2023.

\* cited by examiner

TECHNIQUES FOR MANAGING BASE STATION BEAM PANIC FOR NEW RADIO TECHNOLOGIES

TECHNICAL FIELD

Aspects of the present disclosure relate generally to wireless communications, and more particularly, to techniques for managing base station beam panic for new radio technologies.

BACKGROUND

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

Systems, methods, and apparatus presented herein each have several innovative aspects, no single one of which is solely responsible for the desirable attributes disclosed herein. The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is provided. The method may include measuring a signal quality of a serving beam from a base station. The method may include determining the signal quality has decreased by at least a first threshold amount. The method may include enabling a signal panic operation to search for a second beam different from the serving beam, in response to the signal quality decreasing by at least the first threshold amount.

In another aspect, a UE including a memory storing instructions and one or more processors coupled with the memory, is provided. The UE may be configured to measure a signal quality of a serving beam from a base station. The UE may be configured to determine the signal quality has decreased by at least a first threshold amount. The UE may be configured to enable a signal panic operation to search for a second beam different from the serving beam, in response to the signal quality decreasing by at least the first threshold amount.

In another aspect, a computer-readable medium storing computer executable code for a UE is provided. The computer-readable medium may include code to measure a signal quality of a serving beam from a base station. The computer-readable medium may include code to determine the signal quality has decreased by at least a first threshold amount. The computer-readable medium may include code to enable a signal panic operation to search for a second beam different from the serving beam, in response to the signal quality decreasing by at least the first threshold amount.

In another aspect, an apparatus is provided. The apparatus may include means for measuring a signal quality of a serving beam from a base station. The apparatus may include means for determining the signal quality has decreased by at least a first threshold amount. The apparatus may include means for enabling a signal panic operation to search for a second beam different from the serving beam, in response to the signal quality decreasing by at least the first threshold amount.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
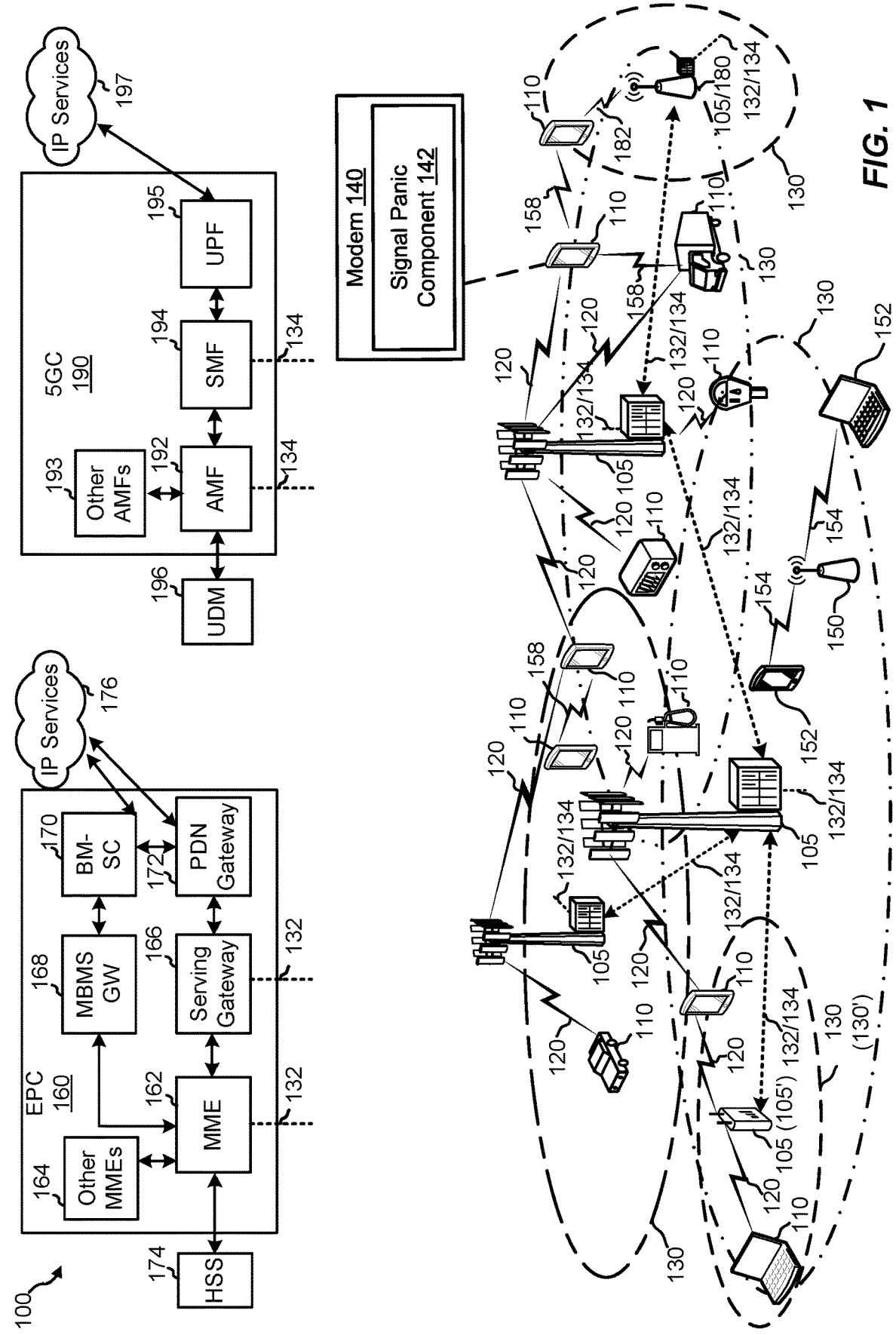
FIG. 1 is a diagram illustrating an example of a wireless communications system and an access network, according to aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

As user equipments (UEs) move from one area to another, the UEs may switch between base stations. In these situations, handovers between base stations are performed to maintain consistent communication links for the UEs. In some situations, the handovers are performed only when a signal is extremely weak which may result in a loss of communication.

Aspects of the present disclosure provide techniques for managing base station beam panic for new radio (NR) technologies. In an example, a UE may measure a signal quality of a serving beam at different times, and based on a difference between the measurements, determine that the signal quality has decreased by a threshold amount. In response to the drop in signal quality, the UE may enable a beam panic operation to search for a new serving beam. During the beam panic operation, a beam search periodicity to search for the beam may be decreased from a first periodicity (e.g., search every 160 milliseconds (ms) per search) to a second periodicity (e.g., search every 40 ms), less than the first periodicity amount, in order to accelerate a likelihood of beam detection.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

Turning now to the figures, examples of systems, apparatus, methods and computer-readable mediums according to aspects of the present disclosure are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes at least one base station 105, at least one UE 110, at least one Evolved Packet Core (EPC) 160, and at least one 5G Core (5GC) 190. The base station 105 may include macro cells (high power cellular base station) and/or small cells (low power cellular base station). The macro cells include base stations. The small cells include femtocells, picocells, and microcells.

In an example, a UE 110 may include a modem 140 and/or a signal panic component 142 for managing signal panic operations to reduce a search periodicity for searching for a new base station beam or a new cell.

A base station 105 may be configured for 4G LTE (collectively referred to as Evolved Universal Mobile Telecommunications System (UMTS) Terrestrial Radio Access Network (E-UTRAN)) may interface with the EPC 160 through backhaul links interfaces 132 (e.g., S1, X2, Internet Protocol (IP), or flex interfaces). A base station 105 configured for 5G NR (collectively referred to as Next Generation RAN (NG-RAN)) may interface with 5GC 190 through backhaul links interfaces 134 (e.g., S1, X2, Internet Protocol (IP), or flex interface). In addition to other functions, the base station 105 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base station 105 may communicate directly or indirectly (e.g., through the EPC 160 or 5GC 190) with each other over the backhaul links interfaces 134. The backhaul links 132, 134 may be wired or wireless.

The base station 105 may wirelessly communicate with the UEs 110. Each of the base station 105 may provide communication coverage for a respective geographic coverage area 130. There may be overlapping geographic coverage areas 130. For example, the small cell 105' may have a coverage area 130' that overlaps the coverage area 130 of one or more macro base station 105. A network that includes both small cell and macro cells may be known as a heterogeneous network. A heterogeneous network may also include Home Evolved Node base station (eNBs) (HeNBs), which may provide service to a restricted group known as a closed subscriber group (CSG). The communication links 120 between the base station 105 and the UEs 110 may include uplink (UL) (also referred to as reverse link) transmissions from a UE 110 to a base station 105 and/or downlink (DL) (also referred to as forward link) transmissions from a base station 105 to a UE 110. The communication links 120 may use multiple-input and multiple-output (MIMO) antenna technology, including spatial multiplexing, beamforming, and/or transmit diversity. The communication links may be through one or more carriers. The base station 105/UEs 110 may use spectrum up to Y MHz (e.g., 5, 10, 15, 20, 100, 400, etc. MHz) bandwidth per carrier allocated in a carrier aggregation of up to a total of $Y_x$ MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 110 may communicate with each other using device-to-device (D2D), or sidelink, communication link 158. The D2D communication link 158 may use the DL/UL WWAN spectrum. The D2D communication link 158 may use one or more SL channels, such as a physical SL broadcast channel (PSBCH), a physical SL discovery channel (PSDCH), a physical SL shared channel (PSSCH), and a physical SL control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 105' may operate in a licensed and/or an unlicensed frequency spectrum. When operating in an unlicensed frequency spectrum, the small cell 105' may employ NR and use the same 5 GHz unlicensed frequency spectrum as used by the Wi-Fi AP 150. The small cell 105', employing NR in an unlicensed frequency spectrum, may boost coverage to and/or increase capacity of the access network.

A base station 105, whether a small cell 105' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 110. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 110 to compensate for the path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 110 and the EPC 160. Generally, the MME 162 provides bearer and connection management. All user and protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base station 105 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 110 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 105 may also be referred to as a gNB, Node B, evolved Node B (eNB), an access point, a base transceiver station, a radio base station, an access point, an access node, a radio transceiver, a NodeB, eNodeB (eNB), gNB, Home NodeB, a Home eNodeB, a relay, a repeater, a transceiver function, a basic service set (BSS), an extended service set (ESS), a transmit reception point (TRP), or some other suitable terminology. The base station 105 provides an access point to the EPC 160 or 5GC 190 for a UE 110. Examples of UEs 110 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 110 may be referred to as IoT devices (e.g., parking meter, gas pump, toaster, vehicles, heart monitor, etc.). The UE 110 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
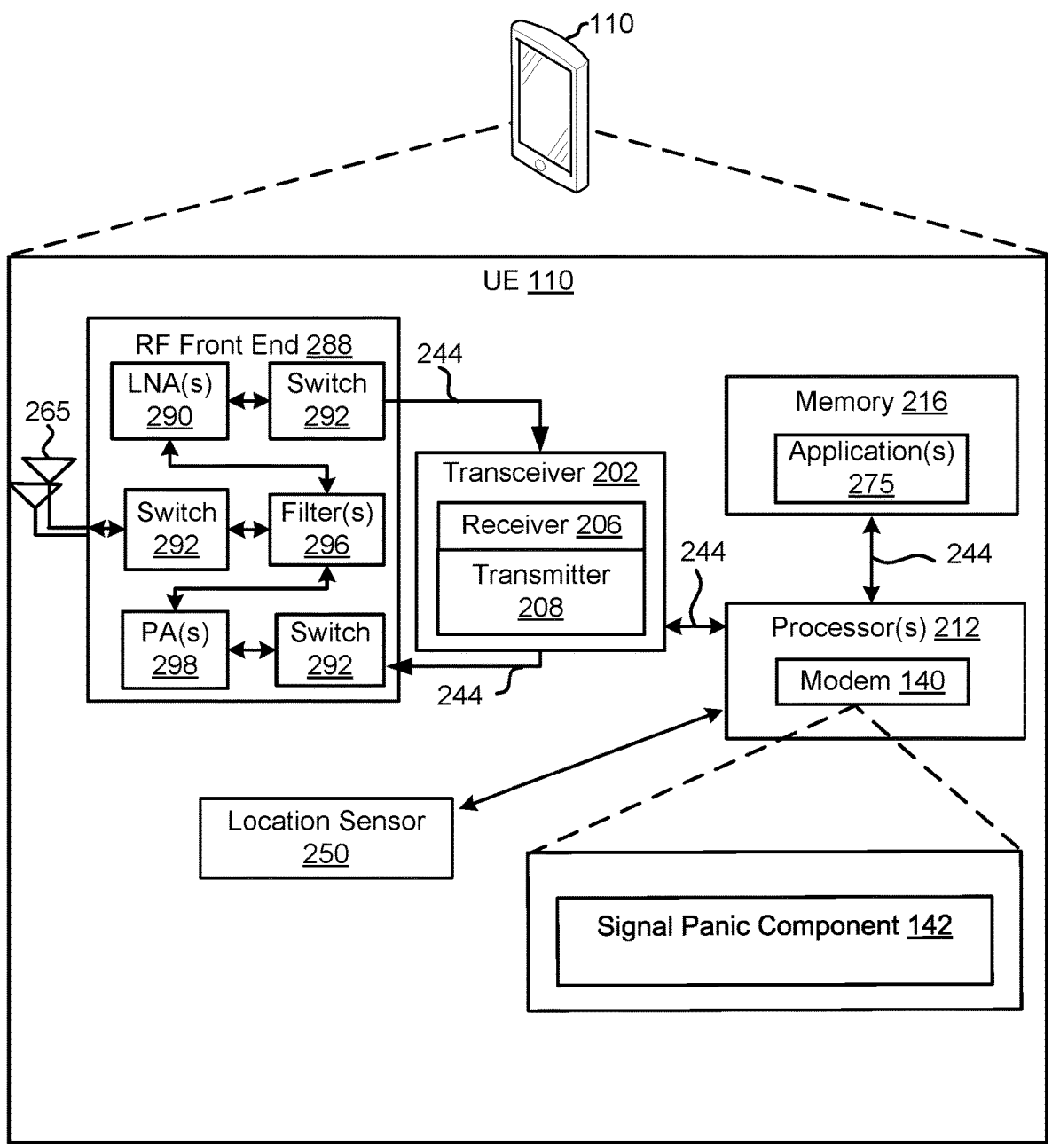
FIG. 2 is a schematic diagram of an example of a user equipment (UE) of FIG. 1, according to aspects of the present disclosure.

Referring to FIG. 2, an example implementation of a UE 110 may include the modem 140 having the signal panic component 142. The modem 140 and/or the signal panic component 142 of the UE 110 may be configured to manage signal panic operations, as described in further detail herein.

In some implementations, the UE 110 may include a variety of components, including components such as one or more processors 212 and memory 216 and transceiver 202 in communication via one or more buses 244, which may operate in conjunction with the modem 140 and/or the signal panic component 142 to enable one or more of the functions, described herein. Further, the one or more processors 212, modem 140, memory 216, transceiver 202, RF front end 288 and one or more antennas 265, may be configured to support voice and/or data calls (simultaneously or non-simultaneously) in one or more radio access technologies. The one or more antennas 265 may include one or more antennas, antenna elements and/or antenna arrays.

In an aspect, the one or more processors 212 may include the modem 140 that uses one or more modem processors. The various functions related to the signal panic component 142 may be included in the modem 140 and/or the processors 212 and, in an aspect, may be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiving device processor, or a transceiver processor associated with transceiver 202. Additionally, the modem 140 may configure the UE 110 along with the processors 212. In other aspects, some of the features of the one or more processors 212 and/or the modem 140 associated with the signal panic component 142 may be performed by the transceiver 202.

Also, the memory 216 may be configured to store data used herein and/or local versions of applications 275 or the signal panic component 142 and/or one or more subcomponents of the signal panic component 142 being executed by at least one processor 212. The memory 216 may include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, the memory 216 may be a non-transitory computer-readable storage medium that stores one or more computer-executable codes defining the signal panic component 142 and/or one or more of its subcomponents, and/or data associated therewith, when the UE 110 is operating at least one processor 212 to execute the signal panic component 142 and/or one or more of the subcomponents.

The transceiver 202 may include at least one receiver 206 and at least one transmitter 208. The receiver 206 may include hardware, firmware, and/or software code executable by a processor for receiving data, the code comprising instructions and being stored in a memory (e.g., computer-readable medium). The receiver 206 may be, for example, an RF receiving device. In an aspect, the receiver 206 may receive signals transmitted by at least one base station 105.

The transmitter 208 may include hardware, firmware, and/or software code executable by a processor for transmitting data, the code comprising instructions and being stored in a memory (e.g., computer-readable medium). A suitable example of the transmitter 208 may include, but is not limited to, an RF transmitter.

Moreover, in an aspect, the UE 110 may include the RF front end 288, which may operate in communication with one or more antennas 265 and the transceiver 202 for receiving and transmitting radio transmissions, for example, wireless communications transmitted by at least one base station 105 or wireless transmissions transmitted by the UE 110. The RF front end 288 may be coupled with one or more antennas 265 and may include one or more low-noise amplifiers (LNAs) 290, one or more switches 292, one or more power amplifiers (PAs) 298, and one or more filters 296 for transmitting and receiving RF signals.

In an aspect, the LNA 290 may amplify a received signal at a desired output level. In an aspect, each of the LNAs 290 may have a specified minimum and maximum gain values. In an aspect, the RF front end 288 may use one or more switches 292 to select a particular LNA 290 and the specified gain value based on a desired gain value for a particular application.

Further, for example, one or more PA(s) 298 may be used by the RF front end 288 to amplify a signal for an RF output at a desired output power level. In an aspect, each of the PAs 298 may have specified minimum and maximum gain values. In an aspect, the RF front end 288 may use one or more switches 292 to select a particular PA 298 and the specified gain value based on a desired gain value for a particular application.

Also, for example, one or more filters 296 may be used by the RF front end 288 to filter a received signal to obtain an input RF signal. Similarly, in an aspect, for example, a respective filter 296 may be used to filter an output from a respective PA 298 to produce an output signal for transmission. In an aspect, each filter 296 may be coupled with a specific LNA 290 and/or PA 298. In an aspect, the RF front end 288 may use one or more switches 292 to select a transmit or receive path using a specified filter 296, the LNA 290, and/or the PA 298, based on a configuration as specified by the transceiver 202 and/or processor 212.

As such, the transceiver 202 may be configured to transmit and receive wireless signals through one or more antennas 265 via the RF front end 288. In an aspect, the transceiver 202 may be tuned to operate at specified frequencies such that the UE 110 may communicate with, for example, one or more of the UEs 110, one or more of the base stations 105, or one or more cells associated with one or more of the base stations 105. In an aspect, for example, the modem 140 may configure the transceiver 202 to operate at a specified frequency and power level based on a control entity configuration of the UE 110 and the communication protocol used by the modem 140.

In an aspect, the modem 140 may be a multiband-multimode modem, which may process digital data and communicate with the transceiver 202 such that the digital data is sent and received using the transceiver 202. In an aspect, the modem 140 may be multiband and be configured to support multiple frequency bands for a specific communications protocol. In an aspect, the modem 140 may be multimode and be configured to support multiple operating networks and communications protocols. In an aspect, the modem 140 may control one or more components of the UE 110 (e.g., RF front end 288, transceiver 202) to enable transmission and/or reception of signals from the network based on a specified modem configuration. In an aspect, a modem configuration may be based on the mode of the modem 140 and the frequency band in use.

In an aspect, the UE 110 may include a location sensor 250 configured to obtain location information corresponding to the UE 110. Examples of the location sensor 250 may include, but are not limited to, an inertial measurement unit (IMU) sensor, a gyroscope sensor, an accelerometer, and/or a global positioning system (GPS) sensor. The location information may include data indicating a movement, a speed, a location, and/or a position of the UE 110 at any given time. In an example, the location sensor 250 may be configured to send the location information to one or more components (e.g., processor 212, modem 140, signal panic component 142) to perform one or more computations corresponding to a signal panic operation based on the location information. In another example, the location sensor 250 may perform the one or more computations corresponding to the signal panic operation and send results of the computation with the location information to a component of the UE 110.

Figure 3:
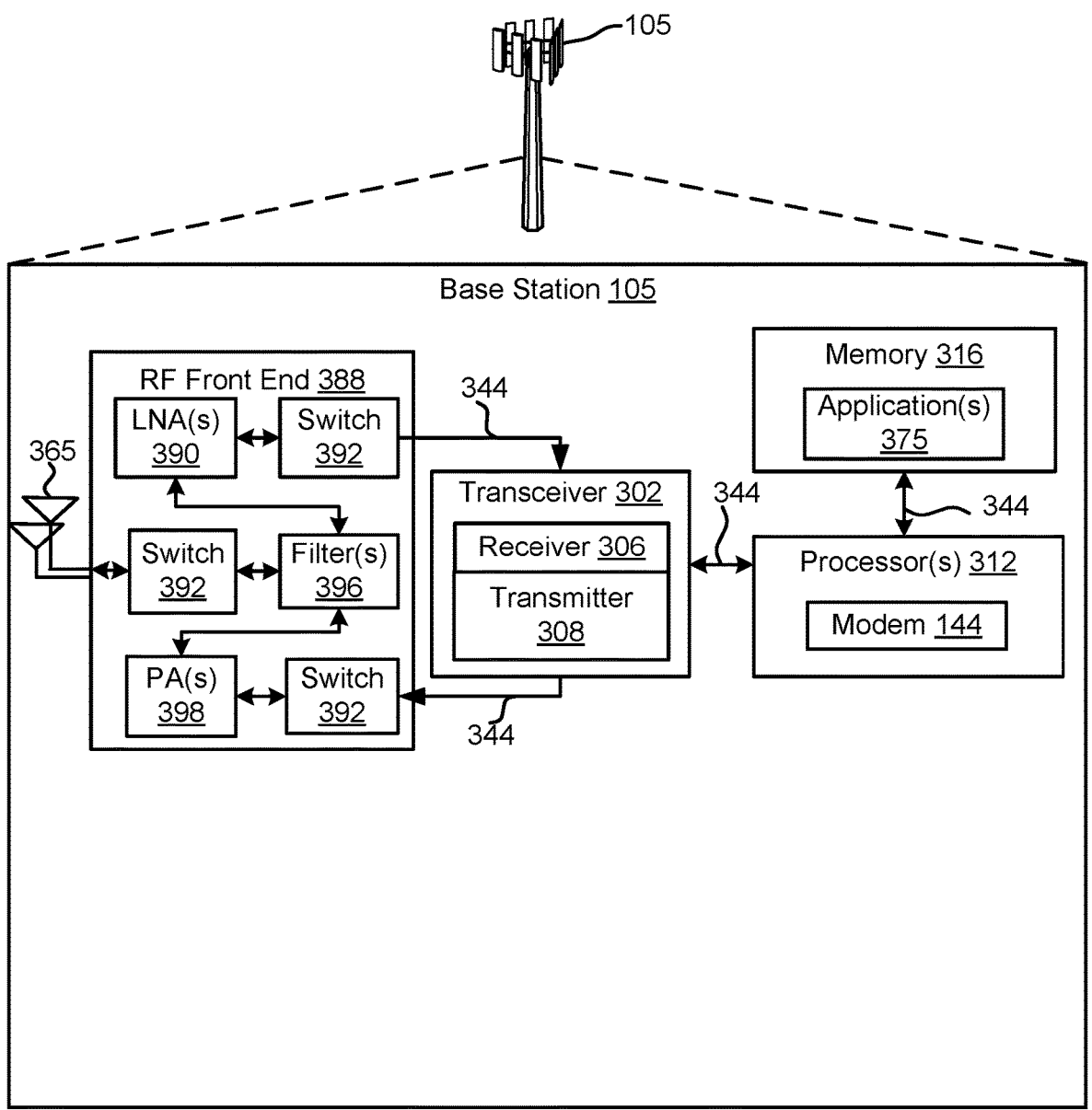
FIG. 3 is a schematic diagram of an example of a base station of FIG. 1, according to aspects of the present disclosure.

Referring to FIG. 3, an example implementation of a base station 105 may include a modem 144 configured to communicate with the UE 110 and/or other base stations 105, as described in further detail herein.

In some implementations, the base station 105 may include a variety of components, including components such as one or more processors 312 and memory 316 and transceiver 302 in communication via one or more buses 344, which may operate in conjunction with the modem 144 to enable one or more of the functions, described herein. Further, the one or more processors 312, the modem 144, the memory 316, the transceiver 302, a RF front end 388, and one or more antennas 365, may be configured to support voice and/or data calls (simultaneously or non-simultaneously) in one or more radio access technologies. The one or more antennas 365 may include one or more antennas, antenna elements and/or antenna arrays.

In an aspect, the one or more processors 312 may include the modem 144 that uses one or more modem processors. The various functions of the modem 144 and/or the processors 312 may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiving device processor, or a transceiver processor associated with the transceiver 302. Additionally, the modem 144 may configure the base station 105 and the processors 312. In other aspects, some of the features of the one or more processors 312 and/or the modem 144 may be performed by the transceiver 302.

Also, the memory 316 may be configured to store data used herein and/or local versions of applications 375, and/or one or more subcomponents of the modem 144 being executed by at least one processor 312. The memory 316 may include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the modem 144 and/or one or more of the subcomponents, and/or data associated therewith, when the base station 105 is operating at least one processor 312 to execute the modem 144 and/or one or more of the subcomponents.

The transceiver 302 may include at least one receiver 306 and at least one transmitter 308. The at least one receiver 306 may include hardware, firmware, and/or software code executable by a processor for receiving data, the code comprising instructions and being stored in a memory (e.g., computer-readable medium). The receiver 306 may be, for example, an RF receiving device. In an aspect, the receiver 306 may receive signals transmitted by the UE 110. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter.

Moreover, in an aspect, the base station 105 may include the RF front end 388, which may operate in communication with one or more antennas 365 and the transceiver 302 for receiving and transmitting radio transmissions, for example, wireless communications transmitted by the base stations 105 or wireless transmissions transmitted by the UEs 110. The RF front end 388 may be coupled with one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use one or more switches 392 to select a particular LNA 390 and the specified gain value based on a desired gain value for a particular application.

Further, for example, one or more PA(s) 398 may be used by the RF front end 388 to amplify a signal for an RF output at a desired output power level. In an aspect, each PA 398 may have specified minimum and maximum gain values. In an aspect, the RF front end 388 may use one or more switches 392 to select a particular PA 398 and the specified gain value based on a desired gain value for a particular application.

Also, for example, one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each filter 396 may be coupled with a specific LNA 390 and/or PA 398. In an aspect, the RF front end 388 may use one or more switches 392 to select a transmit or receive path using a specified filter 396, the LNA 390, and/or the PA 398, based on a configuration as specified by the transceiver 302 and/or the processor 312.

As such, the transceiver 302 may be configured to transmit and receive wireless signals through one or more antennas 365 via the RF front end 388. In an aspect, the transceiver 302 may be tuned to operate at specified frequencies such that the base station 105 may communicate with, for example, the UEs 110, the base station 105, or one or more cells associated with one or more of the base station 105. In an aspect, for example, the modem 144 may configure the transceiver 302 to operate at a specified frequency and power level based on the repeater configuration of the base station 105 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the base station 105 (e.g., RF front end 388, transceiver 302) to enable transmission and/or reception of signals from the network based on a specified modem configuration. In an aspect, the modem configuration may be based on the mode of the modem 144 and the frequency band in use.

Figure 4:
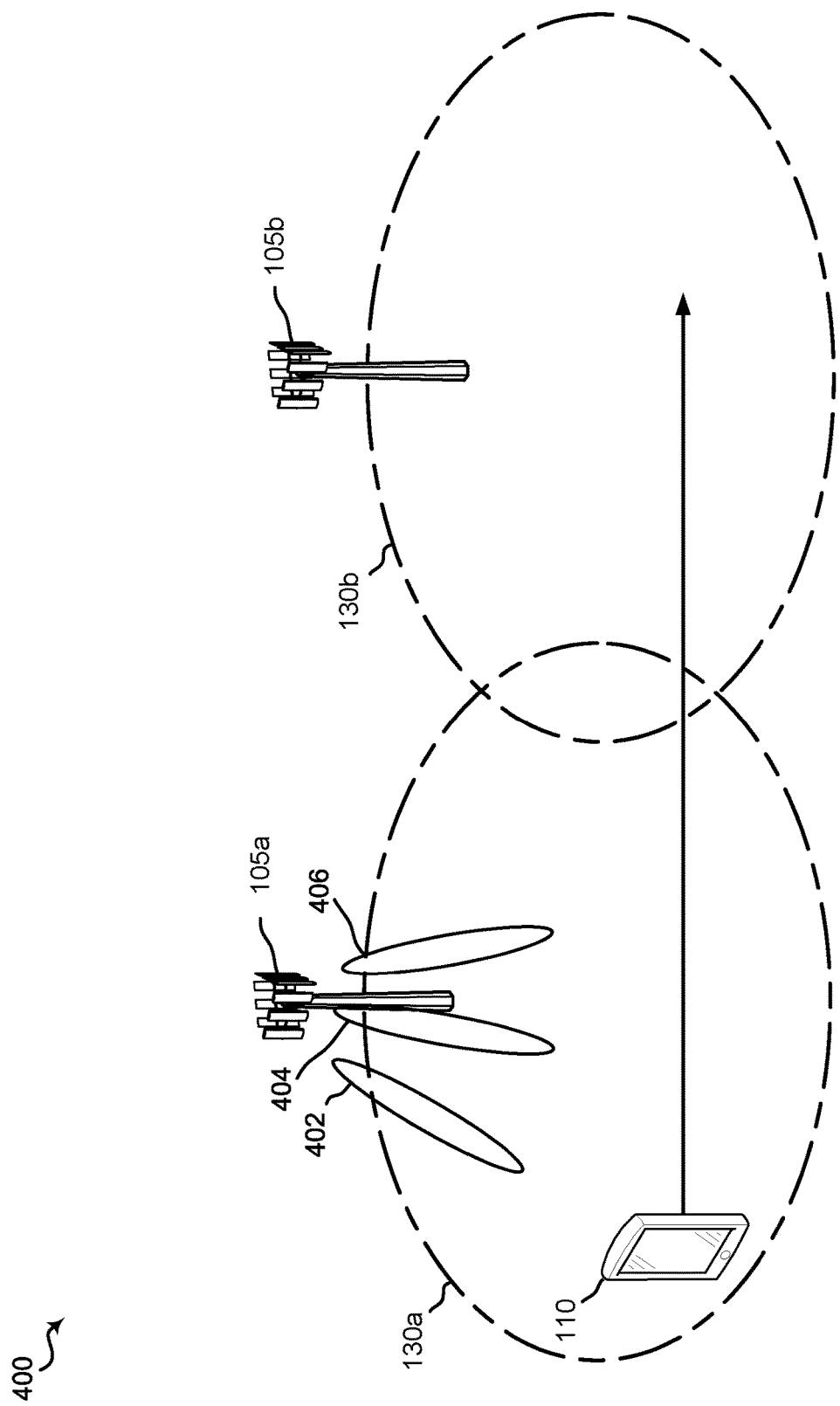
FIG. 4 is a block diagram of an example of a beam switching operation and a cell handover operation, according to aspects of the present disclosure.

Referring to FIG. 4, a UE 110 may move (as indicated by the arrow) from a first coverage area 130a corresponding with a first base station 105a to a second coverage area 130b corresponding with a second base station 105b. During the movement of the UE 110, a handover operation may be performed between the first base station 105a and the second base station 105b so the UE 110 may maintain consistent signal coverage. Further, while the UE 110 is moving within the first coverage area 130a, the UE 110 may switch between different beams, e.g., beams 402, 404, or 406, to maintain consistent signal coverage within the first coverage area 130a. In some situations, a handover operation between base stations or a switching operation between beams typically takes time for the UE 110 to search for and link with or switch to other beams or base stations.

Aspects of the present disclosure, provide techniques for the UE 110 to perform a panic mode to ensure a quick reaction to changing signal conditions. In an example, the panic mode may include both beam switches and/or base station handovers to accelerate a likelihood of signal detection. Further the panic mode described herein may allow for the UE 110 to switch between beams even when a current signal has a high signal quality (e.g., high signal-to-noise ratio (SNR)).

In an example, the UE 110 may perform a cell panic operation to search for a new base station, different from the serving base station, by decreasing a cell search periodicity. The cell search periodicity may refer to a frequency in which a cell is searched for by the UE 110 during a period of time. For example, in a normal mode, a UE 110 may search for a signal or beam every 160 milliseconds (ms), and in a cell panic operation, the UE 110 may search every 40 ms. The cell panic operation may be performed when the signal quality of a current signal is below a cell threshold amount (e.g., SNR is below −6 dB) in order to accelerate cell detection when the UE 110 experiences a low signal quality level.

In another example, the UE 110 may perform a beam panic operation to search for a new beam, different from the serving beam, by decreasing a beam search periodicity. The beam search periodicity may refer to a frequency in which a beam is searched for by the UE 110. For example, in a normal mode, a UE 110 may search every 160 ms, and in a beam panic operation, the UE 110 may search every 40 ms. The beam panic operation may be performed when the signal quality of a serving beam changes by a beam change threshold (e.g., SNR drops 5 dB) in order to accelerate beam detection even when the signal quality for the serving beam is considered to be medium or high.

In another example, the UE 110 may enable/disable the beam panic operation based on location information or mobility information from the location sensor 250. For example, if the location information indicates that the UE 110 is stationary (e.g., UE 110 has moved less than or equal to a threshold amount or a threshold distance), the beam panic operation may be disabled. Alternatively, if the location information indicates that the UE 110 is non-stationary (e.g., UE 110 has moved greater than the threshold amount or the threshold distance), the beam panic operation may be enabled.

In an example, additional resources may be used for measurement of the signal quality.

Aspects of the present disclosure allow the UE 110 to efficiently track signals when the UE 110 is mobile. By accelerating new base station beam detection through a beam panic operation as long as a signal strength of a serving beam becomes weaker, even if the signal quality is in a medium to high range.

Figure 5:
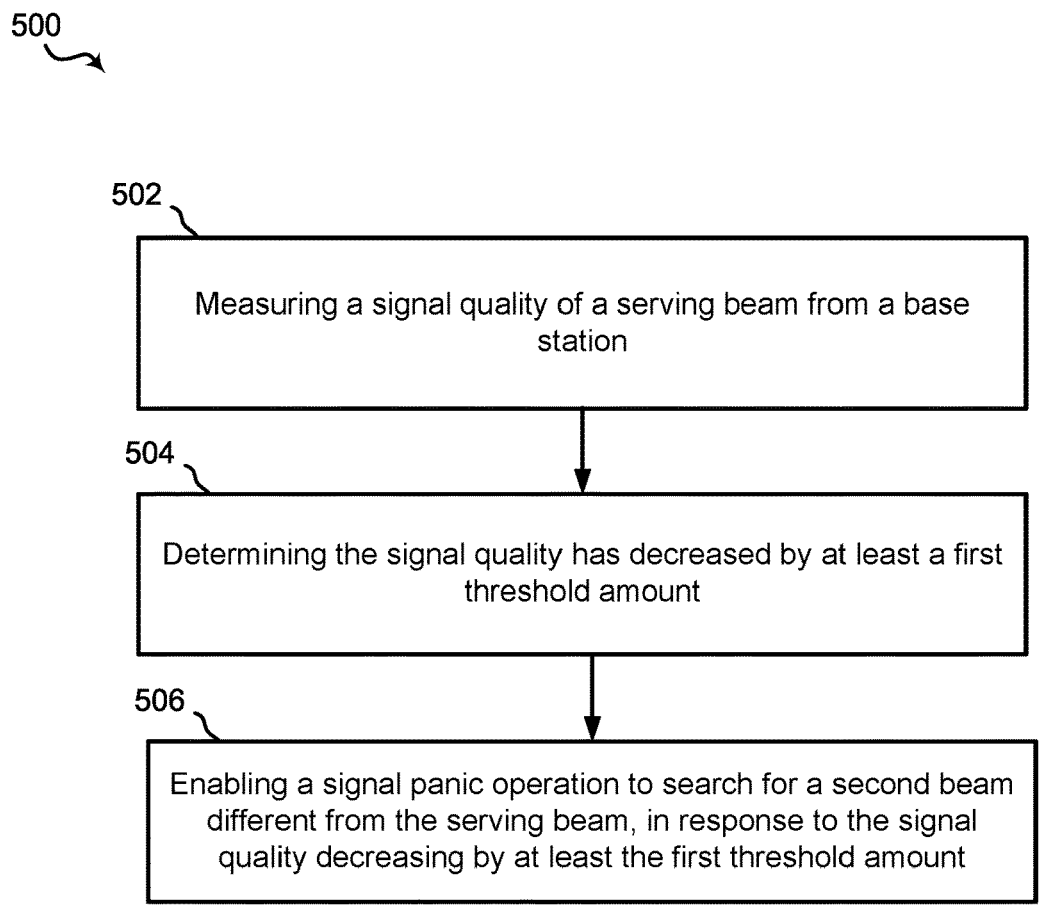
FIG. 5 is flowchart of an example method performed by the UE of FIG. 1, according to aspects of the present disclosure.

Referring to FIG. 5, an example of a method 500 for wireless communications may be performed by the UE 110 of the wireless communication network 100. For example, operations of the method 500 may be performed by the signal panic component 142, the modem 140, the transceiver 202, the processor 212, the memory 216, and or any other component/subcomponent of the UE 110.

At block 502, the method 500 may include measuring a signal quality of a serving beam from a base station. For example, the signal panic component 142, the modem 140, the transceiver 202, the processor 212, and/or the memory 216 of the UE 110, and/or one or more additional components/subcomponents of the UE 110 may be configured to or may comprise means for measuring a signal quality of a serving beam from a base station.

For example, the measuring of the signal quality at block 502 may include measuring by the signal panic component 142, the modem 140, the transceiver 202, the processor 212, and/or the memory 216 of the UE 110, a signal quality (e.g., SNR) of a serving beam (e.g., beam 402 of FIG. 4) from the base station 105.

At block 504, the method 500 may include determining the signal quality has decreased by at least a first threshold amount. For example, the signal panic component 142, the modem 140, the transceiver 202, the processor 212, and/or the memory 216 of the UE 110, and/or one or more additional components/subcomponents of the UE 110 may be configured to or may comprise means for determining the signal quality has decreased from a previous signal quality amount by at least the first threshold amount.

For example, the determining at block 504 may include determining by the signal panic component 142, the modem 140, the transceiver 202, the processor 212, and/or the memory 216 of the UE 110, the signal quality (e.g., SNR) of the serving beam has decreased by at least the first threshold amount (e.g., SNR has dropped by 5 dB).

In an example, the determination may be made based on a difference between the signal quality of the serving beam measured at two different times (e.g., time A and time B). Further, the determination may be based on a comparison of two or more signal quality measurements. For example, the comparison may include the difference between a plurality of consecutive signal quality measurements having an overall drop of X dBs in signal quality.

At block 506, the method 500 may include enabling a signal panic operation to search for a second beam different from the serving beam, in response to the signal quality decreasing by at least the first threshold amount. For example, the signal panic component 142, the modem 140, the transceiver 202, the processor 212, and/or the memory 216 of the UE 110, and/or one or more additional components/subcomponents of the UE 110 may be configured to or may comprise means for enabling a signal panic operation to search for a beam different from the serving beam, in response to the signal quality decreasing by at least the first threshold amount.

For example, the enabling of the signal panic operation at block 506 may include enabling by the signal panic component 142, the modem 140, the transceiver 202, the processor 212, and/or the memory 216 of the UE 110, the signal panic operation to search for a second beam (e.g., beam 404) different from the serving beam (e.g., beam 402 of FIG. 4), in response to the signal quality decreasing by at least the threshold amount.

In an example, the signal panic operation may include decreasing a beam search periodicity from a first periodicity level (e.g., search every 160 ms) to a second periodicity level (e.g., search every 40 ms), less than the second periodicity level, to search for the beam.

In an aspect, the method 500 may include determining whether the UE is stationary or non-stationary. For example, the signal panic component 142, the modem 140, the transceiver 202, the processor 212, and/or the memory 216 of the UE 110, and/or one or more additional components/subcomponents of the UE 110 may be configured to or may comprise means for determining whether the UE is stationary or non-stationary.

For example, the determining of whether the UE is stationary or non-stationary may include determining by the signal panic component 142, the modem 140, the transceiver 202, the processor 212, the memory 216, and/or the location sensor 250 of the UE 110, whether the UE 110 is stationary or non-stationary.

In an example, the location sensor 250 may provide location information to the processor 212, which may, for example, compare current location information with previously received location information to determine whether a change in the location information (and/or the change in location information is greater than a location threshold) occurred. If a change occurred, the processor 212 may determine the UE 110 is non-stationary. If no change occurred, the processor 212 may determine the UE 110 is non-stationary. Alternatively, if there is no change in location information (or the change in location information is less than or equal to the location threshold), the processor 212 may determine the UE 110 is stationary.

If the UE 110 is non-stationary, the signal panic component 142, the modem 140, the processor 212, and/or the memory 216 may enable the signal panic operation. If the UE 110 is stationary, the signal panic component 142, the modem 140, the processor 212, and/or the memory 216 may disable (or maintain disabled) the signal panic operation.

In an aspect, the method 500 may include determining whether the signal quality is greater than a second threshold amount. For example, the signal panic component 142, the modem 140, the transceiver 202, the processor 212, and/or the memory 216 of the UE 110, and/or one or more additional components/subcomponents of the UE 110 may be configured to or may comprise means for determining the signal quality is greater than a second threshold amount.

For example, the signal panic component 142, the modem 140, the transceiver 202, the processor 212, and/or the memory 216 of the UE 110 may compare an SNR value to the second threshold amount (e.g, −6 dB), and enable a signal panic operation if the SNR value is greater than the second threshold amount. Alternatively, the signal panic component 142, the modem 140, the transceiver 202, the processor 212, and/or the memory 216 of the UE 110 may disable the signal panic operation if the SNR value is equal to or less than the second threshold amount because the UE 110 will need to perform a cell panic operation.

In an aspect, the method 500 may include comparing the signal quality to one or more previous signal quality measurements, wherein the signal quality is determined to have decreased by at least the first threshold amount based on the comparing. For example, the signal panic component 142, the modem 140, the transceiver 202, the processor 212, and/or the memory 216 of the UE 110, and/or one or more additional components/subcomponents of the UE 110 may be configured to or may comprise means for comparing the signal quality to one or more previous signal quality measurements, wherein the signal quality is determined to have decreased by at least the first threshold amount based on the comparing.

For example, the signal panic component 142, the modem 140, the transceiver 202, the processor 212, and/or the memory 216 of the UE 110 may compare the signal quality to one or more previous signal quality measurements (e.g., one or more consecutive signal quality measurements previously obtained) to determine the signal quality has decreased the first threshold amount.

ADDITIONAL IMPLEMENTATIONS

An example method of wireless communication by a UE, comprising: measuring a signal quality of a serving beam from a base station; determining the signal quality has decreased by at least a first threshold amount; and enabling a signal panic operation to search for a second beam different from the serving beam, in response to the signal quality decreasing by at least the first threshold amount.

The above-example method, wherein the signal panic operation comprises decreasing a beam search periodicity to search for the second beam.

One or more of the above-example methods, further comprising: determining whether the UE is stationary or non-stationary; and disabling the signal panic operation, in response to the UE being stationary, wherein the signal panic operation is enabled in further response to the UE being non-stationary.

One or more of the above-example methods, wherein the determining whether the UE is stationary or non-stationary is based on one or more sensor inputs from a sensor of the UE.

One or more of the above-example methods, further comprising: determining the signal quality is greater than a second threshold amount, wherein the signal panic operation is enabled in further response to the signal quality being greater than the second threshold amount.

One or more of the above-example methods, further comprising: determining the signal quality is equal to or less than the second threshold amount; and enabling a cell panic operation to search for a second base station different from the base station, in response to the signal quality being equal to or less than the second threshold amount.

One or more of the above-example methods, further comprising: switching from the serving beam to the second beam, in response to the signal panic operation.

One or more of the above-example methods, wherein the signal quality corresponds to an SNR of the serving beam.

One or more of the above-example methods, further comprising: comparing the signal quality to one or more previous signal quality measurements, wherein the signal quality is determined to have decreased by at least the first threshold amount based on the comparing.

An example UE, comprising: a memory storing instructions; and one or more processors coupled with the memory and configured to: measure a signal quality of a serving beam from a base station; determine the signal quality has decreased by at least a first threshold amount; and enable a signal panic operation to search for a second beam different from the serving beam, in response to the signal quality decreasing by at least the first threshold amount.

The above-example UE, wherein the signal panic operation comprises a decrease in a beam search periodicity to search for the second beam.

One or more of the above-example UEs, wherein the one or more processors if further configured to: determine whether the UE is stationary or non-stationary; and disable the signal panic operation, in response to the UE being stationary, wherein the signal panic operation is enabled in further response to the UE being non-stationary.

One or more of the above-example UEs, wherein determining whether the UE is stationary or non-stationary is based on one or more sensor inputs from a sensor of the UE.

One or more of the above-example UEs, wherein the one or more processors if further configured to: determine the signal quality is greater than a second threshold amount, wherein the signal panic operation is enabled in further response to the signal quality being greater than the second threshold amount.

One or more of the above-example UEs, wherein the one or more processors if further configured to: determine the signal quality is equal to or less than the second threshold amount; and enable a cell panic operation to search for a second base station different from the base station, in response to the signal quality being equal to or less than the second threshold amount.

One or more of the above-example UEs, wherein the one or more processors if further configured to: switch from the serving beam to the second beam, in response to the signal panic operation.

One or more of the above-example UEs, wherein the signal quality corresponds to an SNR of the serving beam.

One or more of the above-example UEs, wherein the one or more processors if further configured to: compare the signal quality to one or more previous signal quality measurements, wherein the signal quality is determined to have decreased by at least the first threshold amount based on the comparison.

An example computer-readable medium storing computer executable code for a UE, comprising code to: measure a signal quality of a serving beam from a base station; determine the signal quality has decreased by at least a first threshold amount; and enable a signal panic operation to search for a second beam different from the serving beam, in response to the signal quality decreasing by at least the first threshold amount.

The above-example computer-readable medium, wherein the signal panic operation comprises decreasing a beam search periodicity to search for the second beam.

One or more of the above-example computer-readable mediums, further comprising code to: determine whether the UE is stationary or non-stationary; and disable the signal panic operation, in response to the UE being stationary, wherein the signal panic operation is enabled in further response to the UE being non-stationary.

One or more of the above-example computer-readable mediums, wherein determining whether the UE is stationary or non-stationary is based on one or more sensor inputs from a sensor of the UE.

One or more of the above-example computer-readable mediums, further comprising code to: determine the signal quality is greater than a second threshold amount, wherein the signal panic operation is enabled in further response to the signal quality being greater than the second threshold amount.

One or more of the above-example computer-readable mediums, further comprising code to: determine the signal quality is equal to or less than the second threshold amount; and enable a cell panic operation to search for a second base station different from the base station, in response to the signal quality being equal to or less than the second threshold amount.

One or more of the above-example computer-readable mediums, further comprising code to: switching from the serving beam to the second beam, in response to the signal panic operation.

One or more of the above-example computer-readable mediums, wherein the signal quality corresponds to an SNR of the serving beam.

One or more of the above-example computer-readable mediums, further comprising code to: compare the signal quality to one or more previous signal quality measurements, wherein the signal quality is determined to have decreased by at least the first threshold amount based on the comparison.

An example apparatus, comprising: means for measuring a signal quality of a serving beam from a base station; means for determining the signal quality has decreased by at least a first threshold amount; and means for enabling a signal panic operation to search for a second beam different from the serving beam, in response to the signal quality decreasing by at least the first threshold amount.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

It should be noted that the techniques described herein may be used for various wireless communication networks such as CDMA, TDMA, FDMA, OFDMA, SCFDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA.

A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description herein, however, describes an LTE/LTE-A system or 5G system for purposes of example, and LTE terminology is used in much of the description below, although the techniques may be applicable other next generation communication systems.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   measuring a signal quality of a serving beam from a base station;
   determining the signal quality has decreased by at least a first threshold amount; and
   enabling a signal panic operation to search for a second beam different from the serving beam, in response to the signal quality decreasing by at least the first threshold amount.

2. The method of claim 1, wherein the signal panic operation comprises decreasing a beam search periodicity to search for the second beam.

3. The method of claim 1, further comprising:
   determining whether the UE is stationary or non-stationary; and
   disabling the signal panic operation, in response to the UE being stationary, wherein the signal panic operation is enabled in further response to the UE being non-stationary.

4. The method of claim 3, wherein the determining whether the UE is stationary or non-stationary is based on one or more sensor inputs from a sensor of the UE.

5. The method of claim 1, further comprising:
determining the signal quality is greater than a second threshold amount, wherein the signal panic operation is enabled in further response to the signal quality being greater than the second threshold amount.

6. The method of claim 5, further comprising:
determining the signal quality is equal to or less than the second threshold amount; and
enabling a cell panic operation to search for a second base station different from the base station, in response to the signal quality being equal to or less than the second threshold amount.

7. The method of claim 1, further comprising:
switching from the serving beam to the second beam, in response to the signal panic operation.

8. The method of claim 1, wherein the signal quality corresponds to a signal-to-noise ratio (SNR) of the serving beam.

9. The method of claim 1, further comprising:
comparing the signal quality to one or more previous signal quality measurements, wherein the signal quality is determined to have decreased by at least the first threshold amount based on the comparing.

10. A user equipment (UE), comprising:
a memory storing instructions; and
one or more processors coupled with the memory and configured to:
measure a signal quality of a serving beam from a base station;
determine the signal quality has decreased by at least a first threshold amount; and
enable a signal panic operation to search for a second beam different from the serving beam, in response to the signal quality decreasing by at least the first threshold amount.

11. The UE of claim 10, wherein the signal panic operation comprises a decrease in a beam search periodicity to search for the second beam.

12. The UE of claim 10, wherein the one or more processors if further configured to:
determine whether the UE is stationary or non-stationary; and
disable the signal panic operation, in response to the UE being stationary, wherein the signal panic operation is enabled in further response to the UE being non-stationary.

13. The UE of claim 12, wherein determining whether the UE is stationary or non-stationary is based on one or more sensor inputs from a sensor of the UE.

14. The UE of claim 10, wherein the one or more processors if further configured to:
determine the signal quality is greater than a second threshold amount, wherein the signal panic operation is enabled in further response to the signal quality being greater than the second threshold amount.

15. The UE of claim 14, wherein the one or more processors if further configured to:
determine the signal quality is equal to or less than the second threshold amount; and
enable a cell panic operation to search for a second base station different from the base station, in response to the signal quality being equal to or less than the second threshold amount.

16. The UE of claim 10, wherein the one or more processors if further configured to:
switch from the serving beam to the second beam, in response to the signal panic operation.

17. The UE of claim 10, wherein the signal quality corresponds to a signal-to-noise ratio (SNR) of the serving beam.

18. The UE of claim 10, wherein the one or more processors if further configured to:
compare the signal quality to one or more previous signal quality measurements, wherein the signal quality is determined to have decreased by at least the first threshold amount based on the comparison.

19. A non-transitory computer-readable medium storing computer executable code for a user equipment (UE), comprising code to:
measure a signal quality of a serving beam from a base station;
determine the signal quality has decreased by at least a first threshold amount; and
enable a signal panic operation to search for a second beam different from the serving beam, in response to the signal quality decreasing by at least the first threshold amount.

* * * * *